Sept. 15, 1970   B. E. RESENER   3,528,526
LUBRICANT CAPSULE FOR CHAIN COUPLINGS
Filed Jan. 15, 1968   2 Sheets-Sheet 1
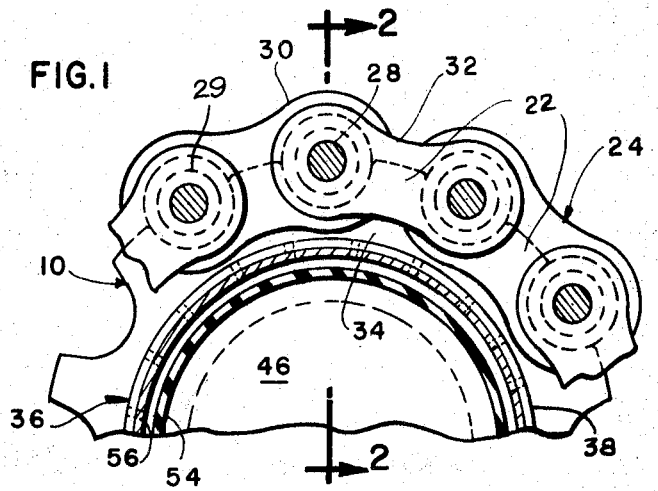
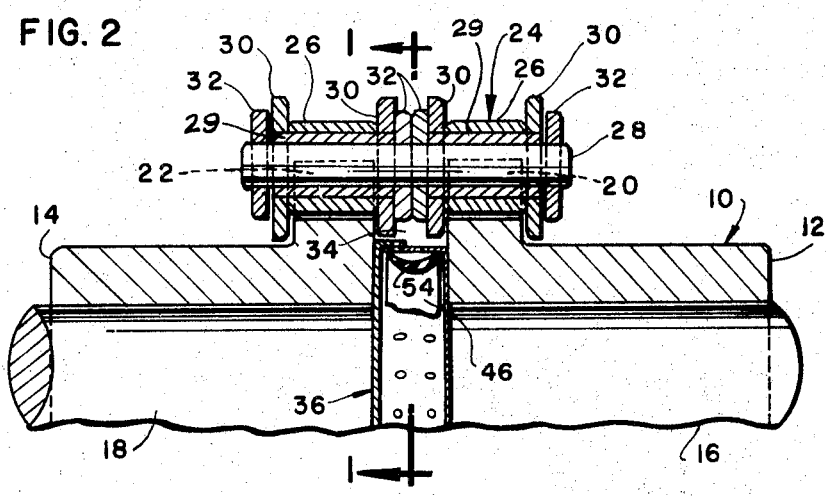
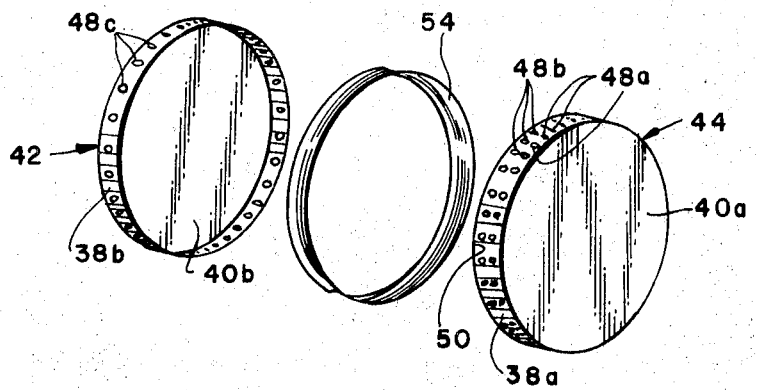
INVENTOR.
BAIRD E. RESENER
BY
ATT'Y Sept. 15, 1970      B. E. RESENER      3,528,526
LUBRICANT CAPSULE FOR CHAIN COUPLINGS
Filed Jan. 15, 1968      2 Sheets-Sheet 2
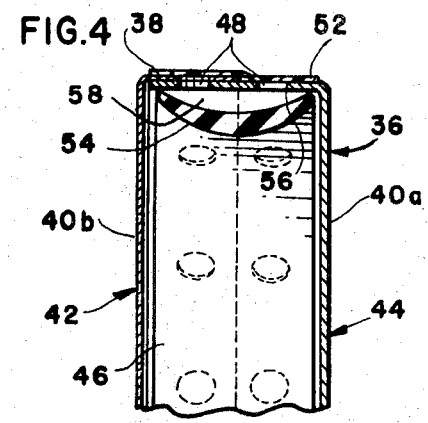
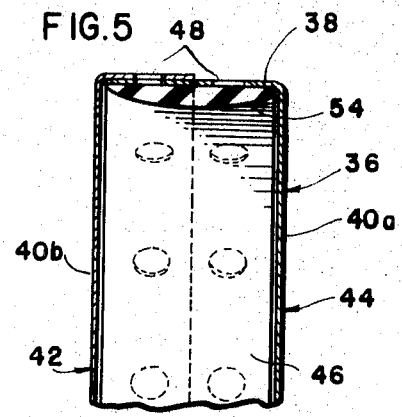
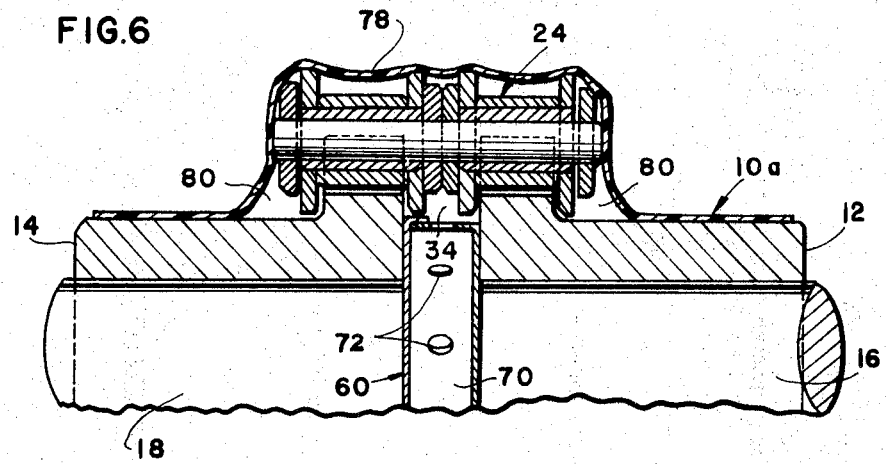
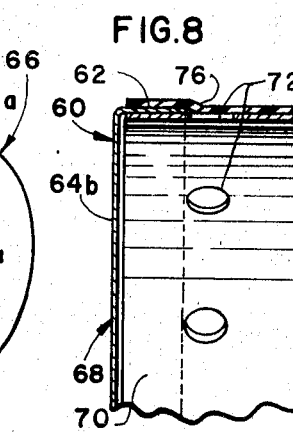
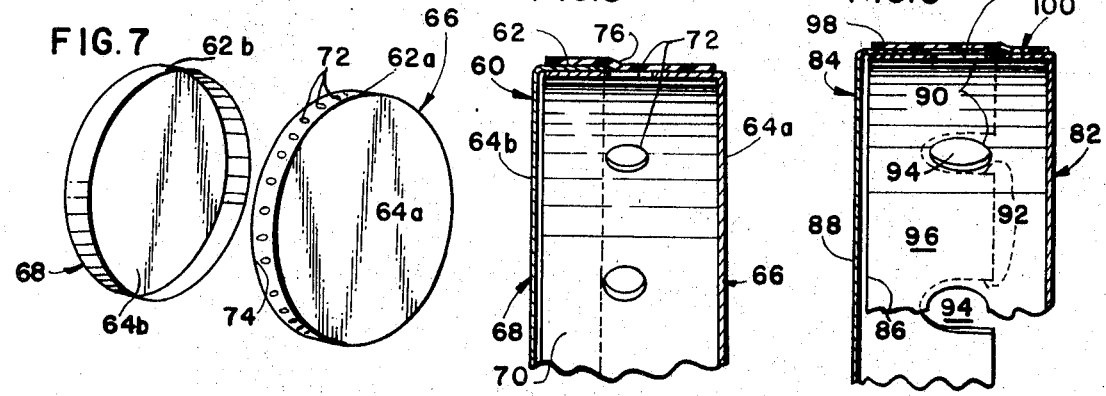
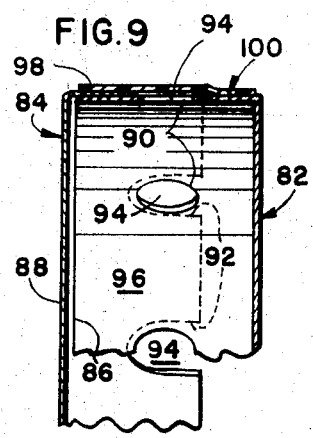
INVENTOR.
BAIRD E. RESENER
BY
ATT'Y

United States Patent Office 3,528,526
Patented Sept. 15, 1970

3,528,526
LUBRICANT CAPSULE FOR CHAIN COUPLINGS
Baird E. Resener, Indianapolis, Ind., assignor to Amsted Industries Incorporated, Chicago, Ill., a corporation of Delaware
Filed Jan. 15, 1968, Ser. No. 698,025
Int. Cl. F01m 9/00; F16h 57/04; F16d 3/70
U.S. Cl. 184—15
7 Claims

ABSTRACT OF THE DISCLOSURE

A centrifugal lubricator for a coupling apparatus is frictionally nestled in the opening defined by spaced, opposed members secured to independent shafts and interconnected by coupling means. The lubricator comprises a capsule having apertures in a periphery edge for dispatching lubricant from the capsule's cavity to the coupling means.

---

This invention relates generally to pre-packaged lubricant capsules and has particular application in the lubrication of flexible, chain type, couplings.

Chain couplings are generally used to protect connected, independently installed components from overloading and excessive wear imposed by shaft bending resulting from misalignment and shaft end-float. The ends of the shafts of the components are each secured to co-axial, adjacent, complimentary sprockets interconnected by a roller type chain mating with the sprocket teeth, thereby creating a flexible coupling between the two components. Movement of one of the shafts relative to the other causes the chain to articulate about the sprockets resulting in frictional wear between the coupling members. To prevent the bearing surfaces of the chain and sprockets from deteriorating, it is highly desirable to maintain a lubricating film between the rubbing surfaces of these members. Maintaining proper lubrication of an exposed coupling is usually done manually by applying oil or grease with a brush and is a time consuming, inconvenient and expensive operation.

When the coupling is operating at excesive speeds, under abrasive or moist conditions, or under other conditions where manual lubrication is found to be inadequate, the coupling is generally enclosed in a grease retaining casing. Grease is usually applied to these casings by a grease gun where appropriate fittings are available. Under new procedures, many of these casings are being constructed from heat shrinkable plastic devoid of grease fittings and access to the coupling. In these latter type couplings, grease must be applied directly to the opening between the sprockets prior to enclosing the coupling in its heat shrinkable plastic casing. Appling grease in this manner is the most time consuming and annoying operation in assembling these couplings. Therefore, an object of this invention is to provide a simple, inexpensive means for lubricating a flexible coupling.

Another object of this invention is to provide a simple, inexpensive, pre-packaged lubricant capsule that will fit within an enclosed flexible coupling and discharge the correct amount and type of lubricant to the coupling.

A further object of this invention is to provide a simple, inexpensive, pre-packaged lubricant capsule that will intermittently lubricate a coupling's moving parts under operating conditions.

Still another object of this invention is to provide a simple, inexpensive lubricant capsule that may be retained by a moving member and furnish lubricant to the member's moving parts.

The invention embodies other novel features, details of construction and arrangement of parts which are hereinafter set forth in the specification and claims and illustrated in the accompanying drawings, forming part thereof, wherein:

FIG. 1 is a fragmentary side elevational view taken on a line comparable to 1—1 of FIG. 2, illustrating an open flexible chain coupling and lubricant capsule and embodies features of this invention;

FIG. 2 is a front view in section, taken on a line comparable to 2—2 of FIG. 1 illustrating a portion of a flexible coupling;

FIG. 3 is an exploded view of the lubricant capsule shown in FIG. 2 and embodies features of this invention;

FIG. 4 is a fragmentary side elevational view, in section, of the lubricant capsule shown in FIG. 2 showing the resilient hoop in a relaxed position;

FIG. 5 is a view of FIG. 4 illustrating the resilient hoop in a flattened position;

FIG. 6 is a fragmentary front view, partly in section, of a portion of a flexible chain coupling enclosed in a heat shrinkable plastic casing and a lubricant capsule and embodies features of this invention;

FIG. 7 is an exploded view of the lubricant capsule shown in FIG. 6 and embodies features of this invention;

FIG. 8 is a fragmentary side elevational view, in section, of the lubricant capsule shown in FIG. 7; and FIG. 9 is a fragmentary side elevational view, in section, of another embodiment of the lubricant capsule shown in FIG. 6.

Describing the invention in detail and referring to the embodiment shown in FIGS. 1–5 of the drawings, in which, FIGS. 1 and 2 illustrate a chain type flexible coupling, shown generally at 10, having co-axial, opposed sprockets 12 and 14 respectively secured to independent shafts 16 and 18. Each sprocket 12 and 14 has a plurality of spaced, matching teeth 20 and 22. An endless multi-strand roller chain, shown generally at 24 has a plurality of aligned rollers 26 pivotally secured for complimentary movement by pins 28, bushings 29 affixed to roller links 30 and pin links 32. The rollers 26, on the chain 24, mate with opposed, aligned teeth 20 and 22 on the sprockets 12 and 14 thereby forming a flexible coupling between the two sprockets 12 and 14, whereby the rotation of sprocket 12 will be directly imparted to sprocket 14. An opening 34 is defined by the two sprockets 12 and 14 and the chain 24.

A cylindrical lubricant capsule shown generally at 36, having a periphery edge 38 and a pair of side faces 40a and 40b, is frictionally nestled in the opening 34 of the coupling 10. The lubricant capsule 36, as shown in FIGS. 1 through 5, comprises two telescoping, circular cup-like housings 42 and 44, rigidly interconnected in a fixed relation, as by cementing, defining a cavity 46 in which lubricant, such as grease, is retained. Rows of spaced, aligned apertures 48 on the periphery edge 38 of the capsult 36 open into the cavity 46 and are proximate the faces 40a and 40b. The embodiment of the capsule 36, illustrated in FIGS. 3, 4 and 5, shows the housing 44 having two rows of apertures 48a and 48b on its periphery edge 38a. One row of apertures 48a is proximate the side face 40a of housing 44 and the other row of apertures 48b is proximate the front edge 50 of housing 44. The housing 44 telescopes within the housing 42 until the front edge 50 contacts the side face 40b of housing 42. Apertures 48c proximate the side face 40b of housing 42 are alignable with corresponding apertures 48b proximate the front edge 50 of housing 44.

A resilient hoop 54, having an arcuate cross section, is retained in the cavity 46 and has, in a relaxed or non-operating position, see FIG. 4, an outer diameter slightly less than the inner diameter of the lubricant capsule 36 and a width slightly less than the width of the cavity 46.

In a flattened or operative position, see FIG. 5, the resilient hoop 54 has a width, the same as, or slightly greater than the width of the cavity 46.

When the lubricant capsule 36 is not in use, the apertures 48 are sealed, as by tape 52, shown in FIG. 4, thereby keeping the lubricant in the cavity 46 free from contaminates and permitting the capsule 36 to be easily and neatly stored. Before placing the capsule 36 into the opening 34 of the coupling 10, the tape 52 is removed exposing the rows of apertures 48.

In operation, the lubricant capsule 36 rotates with the coupling 10, causing the resilient hoop 54 to move from its relaxed position outward toward the inner peripheral surface 56 of the capsule 36 into a flattened position by the action of centrifugal force caused by rotation and the urging of the centrifugally slung grease behind the hoop 54. As the hoop 54 flattens, the grease in the hoop opening 58, between the hoop 54 and the inner peripheral surface 56 of the capsule 36, is urged out through the apertures 48 and centrifugally slung against the bearing surfaces between the chain 24 and sprockets 12 and 14. The remaining grease in the cavity 46 is centrifugally forced outward, flattening the hoop 54 further and consequently forcing the hoop 54 against the inner peripheral surface 56, thereby sealing the apertures 48. When the coupling 10 is again slowed down, as to stop it, the hoop 54 begins to relax at a speed greater than zero revolutions per minute, for example, 300 to 400 revolutions per minute, causing the lubricant in the cavity 46 to be urged outward by the centrifugal force of rotation, around the relaxed hoop 54, into the hoop opening 58 and to the chain 24 and sprockets 12 and 14. Lubricant is retained in the hoop opening 58 of the capsule 36 after the rotation has stopped and upon a subsequent rotation of the coupling 10, the lubricant in the hoop opening 58 is again squeezed out to lubricate the coupling as described above.

The invention may be embodied in several other forms, another being illustrated in FIGS. 6, 7 and 8. FIG. 6 illustrates a flexible chain coupling 10a similar to the coupling 10 shown in FIGS. 1 and 2 but having a heat shrinkable plastic casing 78 enclosing the chain 24, and teeth 20 and 22 of the sprockets 12 and 14 thereby sealing the chain 24, sprocket teeth 20 and 22 and cavity 34 from the atmosphere.

A lubricant capsule, shown generally at 60, having a periphery edge 62 and side faces 64a and 64b, comprises telescoping, circular, cup-like housings 66 and 68 rigidly interconnected in a fixed relationship, as by cementing, and forming a cavity 70 in which lubricant, such as grease, is retained. The capsule 60 has a row of spaced apertures 72 on the periphery edge 62a of the housing 66 opening into the cavity 70. The housing 66 telescopes within the housing 68 until the fornt edge 74 mates with the side face 64b of housing 68. The periphery edge 62b of housing 68 partially overlaps the periphery edge 62a of housing 66, leaving the apertures 72 exposed. When the capsule 60 is not in use, the apertures 72 may be sealed, as by tape 76, placed around the periphery edge 62 of the capsule 60.

In assembly, the lubricant capsule 60, containing the proper amount and type of lubricant, is frictionally nestled in the opening 34 between the opposed, co-axial, complimentary sprockets 12 and 14 which are secured to the shafts 16 and 18. As shown in FIG. 6, the tape 76 is removed, exposing the apertures 72. The sprockets 12 and 14 are then interconnected by a multi-strand roller chain 24 and the coupling 10a is then enclosed in a heat shrinkable plastic grease retaining casing 78. When the coupling 10a is rotated, the grease or lubricant in the capsule 60 is urged out through the apertures 72 by centrifugal force and into the chamber 80, defined by the casing 78, capule 60 and sprockets 12 and 14.

Another embodiment of the invention is illustrated in FIG. 9 wherein a housing 82 telescopes within a housing 84 until the front edge 86 of the housing 82 contacts the side face 88 of the housing 84. A row of apertures 90 in housing 82 are then aligned with a corresponding row of slots 92 in housing 84 thereby forming openings 94 into the cavity 96 defined by the two housings 82 and 84. Here again, tape 98, or another covering, may be used to seal the openings 94 until the lubricant capsule, shown generally at 100, is placed into the opening 34 of the coupling 10a.

The particular embodiments of the invention, set forth herein by way of an exemplification of practical pre-packaged lubricant capsules, are illustrated as applied to chain type flexible couplings used to connect opposing shafts of independent components, although it is to be understood that the lubricant capsules may be applied with equal advantage to various other couplings and similar devices. It should also be understood that the description of the lubricant capsules is in no way intended to limit the embodiments of this invention as set forth in the specifications and drawings.

What is claimed is:

1. In a rotating coupling apparatus including independent, spaced, opposed shafts, members secured to the ends of said shafts, coupling means interconnecting the two members for transmitting the rotation of one shaft to the other shaft, and an opening defined by the two members and the coupling means, pre-packaged lubricating means frictionally nestled in the opening comprising: a capsule having side faces and an edge facing the coupling means; a lubricant cavity defined by the side faces and the edge; lubricant in the lubricant cavity; and apertures in the edge of the capsule whereby rotation of the coupling apparatus dispatches lubricant through the apertures to the coupling means by centrifugal force.

2. In a coupling apparatus including independent, spaced, co-axial shafts, members secured to the ends of said shafts, coupling means interconnecting the two members for transmitting the rotation of one shaft to the other shaft, and an opening defined by the two members and the coupling means, lubricating means frictionally nestled in the opening comprising: a capsule having circular, cup-like housings telescoped together; a cylindrical cavity in the capsule; lubricant in the cylindrical cavity; apertures in the periphery of the capsule; and a resilient hoop in the cylindrical cavity.

3. The apparatus as set forth in claim 2 wherein the resilient hoop is circular and has an outer diameter less than the inner diameter of the cavity, an arcuate cross section, and an arcuate width less than the width of the cavity.

4. The apparatus as set forth in claim 3 wherein the arcuate cross section of the hoop may be flattened, and the flattened width of the resilient hoop is greater than the width of the cavity.

5. The apparatus as set forth in claim 4 wherein the outer diameter of the resilient hoop may be expanded and the expanded diameter of the resilient hoop is equal to the inner diameter of the cavity.

6. In a flexible, rotating coupling including opposed, spaced sprockets secured to independent shafts, an opening between the sprockets, a chain interconnecting said sprockets, and a casing enclosing and sealing the chain, sprockets and opening from the atmosphere, pre-packaged lubricating means frictionally nestled in the opening comprising: a capsule having opposed, circular cup-like housings telescoped together; a cavity within the capsule; lubricant in the cavity; apertures in the periphery of the capsule opening toward the chain and exposing the cavity whereby rotation of the coupling dispatches lubricant through the apertures to the chain by centrifugal force and into the space between the periphery of the capsule and the casing.

7. In a flexible rotating coupling including opposed, spaced sprockets secured to independent shafts interconnected by a chain and having an opening between the sprockets, lubricating means frictionally nestled in the opening comprising: a capsule having opposed, circular cup-like housings telescoped together; a cylindrical cavity within the capsule; lubricant in the cavity; an expandable resilient hoop in the cavity having an outer diameter less than the inner diameter of the cavity thereby defining a hoop opening between the hoop and inner peripheral surface of the cavity, an expanded outer diameter equal to the inside diameter of the cavity, a flattenable arcuate cross section, an arcuate width less than the width of the cavity, and a flattened width greater than the width of the cavity; and apertures in the periphery of the capsule opening toward the chain, whereby the rotation of the coupling dispatches lubricant from the hoop opening through the apertures by centrifugal force and the force of centrifugally slung lubricant in the cavity pressing outward against the resilient hoop, flattening the hoop and expanding the hoop against the inner peripheral surface of the cavity sealing the apertures.

References Cited
UNITED STATES PATENTS

| | | | |
|---|---|---|---|
| 782,276 | 2/1905 | Roebling | 184—15 XR |
| 1,914,093 | 6/1933 | Adams | 184—15 |
| 2,103,161 | 12/1937 | Kjaer | 184—15 |
| 2,737,264 | 3/1956 | Klaucke | 184—15 |
| 2,909,937 | 10/1959 | Williams | 74—230 |
| 2,051,770 | 8/1936 | McCann | 64—19 |
| 2,587,365 | 2/1952 | Mize | 64—19 |

FRED C. MATTERN, JR., Primary Examiner

MANUEL ANTONAKAS, Assistant Examiner

U.S. Cl. X.R.

64—19; 74—230, 257